(12) United States Patent
Nichols

(10) Patent No.: US 8,480,259 B2
(45) Date of Patent: Jul. 9, 2013

(54) LIGHTING

(75) Inventor: Andrew Tanton Nichols, Auckland (NZ)

(73) Assignee: Koninklijke Philips Electronics N.V., Eindhoven (NL)

( * ) Notice: Subject to any disclaimer, the term of this patent is extended or adjusted under 35 U.S.C. 154(b) by 852 days.

(21) Appl. No.: 11/991,743

(22) PCT Filed: Sep. 4, 2006

(86) PCT No.: PCT/NZ2006/000236
§ 371 (c)(1),
(2), (4) Date: Feb. 18, 2010

(87) PCT Pub. No.: WO2007/030025
PCT Pub. Date: Mar. 15, 2007

(65) Prior Publication Data
US 2010/0157602 A1    Jun. 24, 2010

(30) Foreign Application Priority Data
Sep. 9, 2005 (NZ) ........................... 542332

(51) Int. Cl.
*F21V 21/26* (2006.01)

(52) U.S. Cl.
USPC ........... 362/271; 362/273; 362/269; 362/277; 362/391

(58) Field of Classification Search
USPC .................. 362/269–271, 273, 277, 280–285, 362/287, 289, 293–294, 391
See application file for complete search history.

(56) References Cited

U.S. PATENT DOCUMENTS

| | | | |
|---|---|---|---|
| 4,319,313 A | 3/1982 | Eberhart et al. | |
| 4,701,833 A * | 10/1987 | Bornhorst | 362/294 |
| 6,837,596 B2 | 1/2005 | Tanaka et al. | |
| 2003/0072161 A1 * | 4/2003 | Hough et al. | 362/293 |
| 2003/0076682 A1 * | 4/2003 | Tanaka et al. | 362/280 |

FOREIGN PATENT DOCUMENTS

| | | |
|---|---|---|
| WO | WO 99/67569 | 12/1999 |
| WO | WO 01/58326 | 8/2001 |

OTHER PUBLICATIONS

International Search Report dated Dec. 20, 2006.

\* cited by examiner

*Primary Examiner* — Mary Ellen Bowman

(57) ABSTRACT

A lighting apparatus includes one or more of a lens and a focus adjuster, a tilt adjuster, and a pan adjuster, each with corresponding indicia for setting focus, pan and tilt of the light apparatus.

13 Claims, 16 Drawing Sheets

LIGHTING

This is a national stage of PCT/NZ2006/000236 filed on Sep. 4, 2006 and published in English.

FIELD OF THE INVENTION

The present invention relates to a system, method and apparatus for adjusting lighting for theatres, auditoriums, halls and the like. In particular, it relates to a system, method and apparatus for altering the tilt, pan, and/or focus of a stage light or similar, although the invention is not exclusively for this use.

BACKGROUND

Theatres, halls, auditoriums and the like all utilise theatrical lighting or similar for lighting up the stage and other areas of the space. Typically, such lighting is provided by one or more luminaires or other lighting units that are attached to one or more lighting rigs. The lighting rigs are hoisted to the ceiling, and then suspended over the stage and other areas to be lit.

The traditional adjustment methodology of theatre luminaires has been to 'hang' or 'rig' the luminaires on lighting rigs that have been lowered to the stage floor where they are positioned onto the bar as per the lighting plan, connected to the power circuit and then flown out over the stage to the correct height. Alternatively, the rigs may be permanently fixed to the ceiling. Then, the pan, tilt and focus of each of the lighting units attached to the rig must be adjusted to provide the desired lighting effect. To date, the three adjustable parameters of traditional 'fixed' theatre lighting units have been set using separate tools in a time consuming and imprecise manner resulting in a lot of wasted time and frustration. Once the stage setting has been completed, each lighting unit is manually focused, panned and tilted by a technician using a personnel lift or ladder. This is a time consuming process, usually occurring under considerable time pressure and late at night due the constraints of the show change over/set up schedule.

For example, for the pan adjustment, traditional luminaires use a bolt and nut mounted through the suspension hook clamp. The luminaire is panned and then 'locked off' in the desired position. This is carried out using a spanner or such like to adjust the nut during which the luminaire is prone to moving. This can result in the whole positioning process having to be repeated.

Likewise, the traditional tilt adjustment is made using a simple lock clamp disc. This is a disc of metal, on the edge of which a bolt head is then screwed over to clamp the luminaire in position. Being a grab/lock clamp only, once loosened off the luminaire tilt is completely free and is subject to swinging down suddenly to the point of equilibrium.

Beam focus is traditionally undertaken by a simple lamp/reflector slide tray moving in relation to the lens. This is moved by the operator using a knob that drives a lead screw. Focus mechanisms with lead screw are slow to set at the desired focus. In an alternative arrangement, the knob directly moves the tray and is then screw tightened against the luminaire housing to secure the position. This action is subject to movement as the screw action clamps against the body.

It would be desirable to have an easier way of adjusting the settings of lighting.

SUMMARY OF INVENTION

It is an object of the present invention to provide method, system or apparatus to assist in the configuration of lighting for halls, theatres, auditoriums and the like. In general terms, the invention enables at least partial configuration of lighting units prior to the lights, or lighting rigs to which they are attached, being hoisted.

It is an alternative object of the invention to provide a frame adapted for a lighting unit to retain light filters.

In one aspect the present invention may be said to consist in a lighting apparatus comprising: a housing with an aperture, a light source disposed in the housing that is adapted to produce a light beam that passes through the aperture, and one or more of: a lens and a focus adjustment mechanism to adjust the focus of the beam, the focus adjustment mechanism comprising first adjustment indicia, a tilt adjustment mechanism for attachment to the housing that permits adjustment of the direction of the beam, the tilt adjustment mechanism comprising second adjustment indicia, and a pan adjustment mechanism for attachment to the housing or a first support coupled to the housing, which permits adjustment of the direction of the beam, the pan adjustment mechanism comprising third adjustment indicia.

Preferably, the focus adjustment mechanism comprises an actuator to allow manual manipulation of the light source to adjust the focus of the beam.

Preferably, the actuator is connected to a sliding tray in the housing that holds the light source and wherein the actuator allows movement of the relative position between the lens and the light source by manipulation of the tray.

Preferably, the actuator further comprises a spring loaded toggle brake and manual release of the toggle brake to allow and prevent movement of the tray.

Preferably, the lighting apparatus further comprises a slot in the housing through which the actuator protrudes, wherein the first adjustment indicia are displayed on the housing proximate to the slot to indicate beam angles produced corresponding to respective positions of the actuator in the slot.

Preferably, the second adjustment indicia indicate tilt angles of the lighting apparatus.

Preferably, the tilt adjustment mechanism is slidably coupled to the housing and is slidable along the housing to adjust the pivot point of the tilt adjustment mechanism.

Preferably, the tilt adjustment mechanism is slidably coupled to a channel along the housing.

Preferably, the tilt adjustment mechanism comprises: a first coupling adapted to couple the adjustment mechanism to the housing, a second coupling adapted to couple the adjustment mechanism to a first support, wherein the first and second coupling are moveable relative to each other, and a releasable locking mechanism that when locked restricts relative movement between the first and second couplings, wherein the second adjustment indicia are adapted to indicate the extent of tilt.

Preferably, the third adjustment indicia indicate pan angles of the lighting apparatus.

Preferably, the pan adjustment mechanism comprises: a first coupling adapted to couple the adjustment mechanism to the housing or a first support connected to the housing, a second coupling adapted to couple the adjustment mechanism to a light support, wherein the first and second coupling are moveable relative to each other, a releasable locking mechanism that when locked restricts relative movement between the first and second couplings, wherein the third adjustment indicia are adapted to indicate the extent of pan.

Preferably, the first support is a bracket coupled to the housing for supporting the housing from a lighting rig.

Preferably, the light support is a lighting rig.

Preferably, the lighting apparatus further comprises a slidable actuator for retraction and extension of a safety wire.

In another aspect the present invention may be said to consist of an actuator adapted for manipulation of a light source in a lighting apparatus with a lens comprising: a coupling adapted to couple the actuator to a light source adjustment mechanism in a lighting apparatus, and a releasable locking mechanism that, when locked, restricts movement of a light source adjustment means coupled to the actuator, wherein the actuator is adapted for use in combination with adjustment indicia adapted to indicate a beam angle.

Preferably, the light source adjustment mechanism is a sliding tray that holds the light source and wherein the actuator allows movement of the relative position between the lens and the light source by manipulation of the tray.

Preferably, the actuator according further comprises a spring loaded toggle brake and manual release of the toggle brake to allow and prevent movement of the tray.

Preferably, at least part of the actuator is adapted to protrude through a slot in a lighting apparatus housing wherein the adjustment indicia are marked on the housing proximate to the slot and indicate beam angles produced corresponding to respective positions of the actuator in the slot.

In another aspect, the present invention may be said to consist in a tilt adjustment mechanism for a lighting apparatus with a housing comprising: a first coupling adapted to couple the adjustment mechanism to the housing, a second coupling adapted to couple the adjustment mechanism to a first support, wherein the first and second coupling are moveable relative to each other, a releasable locking mechanism that when locked restricts relative movement between the first and second couplings, and adjustment indicia adapted to indicate the extent of tilt.

Preferably, the first and second coupling are rotatable relative to each other.

Preferably, the second coupling is rotatable relative to the first coupling.

Preferably, the first coupling is adapted to couple to a channel in the housing.

Preferably, the adjustment indicia are displayed on the tilt adjustment mechanism on the first and/or second coupling to indicate relative movement between the first and second coupling.

Preferably, the adjustment indicia indicate tilt angles of the lighting apparatus.

Preferably, the first coupling is slidable within the channel to adjust the pivot point of tilt adjustment mechanism.

In another aspect the present invention may be said to consist in a pan adjustment mechanism for a lighting apparatus with a housing comprising: a first coupling adapted to couple the adjustment mechanism to the housing or a first support connected to the housing, a second coupling adapted to couple the adjustment mechanism to a light support, wherein the first and second coupling are moveable relative to each other, a releasable locking mechanism that when locked restricts relative movement between the couplings, and adjustment indicia adapted to indicate the extent of pan.

In other aspect the present invention may be said to consist in a pan adjustment mechanism wherein the first support is a bracket attached to the housing and the first coupling is adapted to couple to the bracket.

Preferably, the first and second coupling are rotatable relative to each other.

Preferably, the second coupling is rotatable relative to the first coupling.

Preferably, the adjustment indicia are displayed on the pan adjustment mechanism on the first and/or second coupling to indicate relative movement between the first and second coupling.

Preferably, the adjustment indicia indicate pan angles of the lighting apparatus.

In another aspect the present invention may be said to consist in a system for adjusting one or more lighting apparatus for illuminating a space comprising: a computer system executing software for modelling lighting requirements in the space, the computer system determining and providing one or more of pan, tilt and focus settings for each of the one or more lighting apparatus, and one or more lighting apparatus adapted with one or more adjustment mechanisms for setting one or more of pan, tilt and focus of the lighting apparatus, the one or more adjustment mechanisms comprising respective adjustment indicia indicating a respective pan, tilt, and/or focus setting.

Preferably, the system further comprises a lighting rig to which the light apparatus are attached or are adapted to be attached.

Preferably, the lighting rig is hoistable to a ceiling.

Preferably, the light rig is attached to a ceiling.

In another aspect the present invention may be said to consist in a method for adjusting one or more lighting apparatus for illuminating a space comprising: determining one or more of pan, tilt and focus settings for each of the one or more lighting apparatus, setting one or more of the pan, tilt and focus settings for each of the one or more lighting apparatus using one or more respective adjustment mechanisms each with indicia indicating a respective pan, tilt, and/or focus setting.

Preferably, the method further comprises attaching the lighting apparatus to a lighting rig and hoisting the lighting rig.

Preferably, the step of setting one or more of the pan, tilt and focus settings for each of the one or more light apparatus takes place after the lighting apparatus have been hoisted to a ceiling.

Preferably, the pan, tilt and focus settings are determined using a computer system executing lighting modelling software. Alternatively the pan, tilt and focus settings are determined by a person.

In another aspect the present invention may be said to consist in a plastic frame for retaining a light filter adapted for use with a lighting apparatus, the plastic frame comprising: a first frame member with a central aperture hinged to a second frame member with a central aperture, the frame members adapted to fold together to clamp a filter at the edges of the frames over the aperture.

In another aspect the present invention may be said to consist in a lighting apparatus comprising: a housing with an aperture, a light source disposed in the housing that is adapted to produce a light beam that passes through the aperture, a lens and a focus adjustment mechanism to adjust the focus of the beam, the focus adjustment mechanism comprising first adjustment indicia, a tilt adjustment mechanism attached to the housing that permits adjustment of the direction of the beam, the tilt adjustment mechanism comprising second adjustment indicia, and a pan adjustment mechanism attached to the housing or a first support coupled to the housing, which permits adjustment of the direction of the beam, the pan adjustment mechanism comprising third adjustment indicia.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Preferred embodiments of the invention will be described with respect to the following drawings, of which:

FIGS. 6a to 6c show various views of a preferred embodiment of the tilt adjustment means, FIG. 12 shows setting parameters determined by modelling software relating to focus, pan and tilt of lighting units.

DETAILED DESCRIPTION OF PREFERRED EMBODIMENTS

The present invention relates to a system, apparatus and method for adjusting lighting in a hall, theatre, auditorium and the like. Preferably the system involves modelling the lighting requirements for a performance in a space using light modelling software, and then determining a lighting plan. The lighting plan includes the lighting units required, their position in the auditorium or on a lighting rig, and their required pan, tilt and focus adjustments. Once the modelling of a space has taken place, the parameters determined by the software can then be used by a technician to place lighting units on a lighting rig and then adjust the pan, tilt and focus adjustments of each lighting unit prior to the lighting rig or the individual lighting units being hoisted and suspended from the ceiling. Preferably, the lighting unit is in accordance with an apparatus of the invention, and has adjustment mechanisms that allow for pre-adjustment of the pan, tilt and focus prior to hoisting. The adjustment mechanisms provide adjustment indicia to enable pre-adjustment to take place. Further, the lighting units in accordance with an apparatus of the invention preferably allow for hand adjustment without the need for tools. This simplifies the adjustment process and also allows for final adjustments to take place once the lights have been hoisted. Once the initial adjustment of the lights in the lighting rig has been made according to the parameters determined by the modelling software, the lighting rig is hoisted to the ceiling. Final hand adjustments may be made by a technician following hoisting of the lighting rig, if required.

Figure 1:
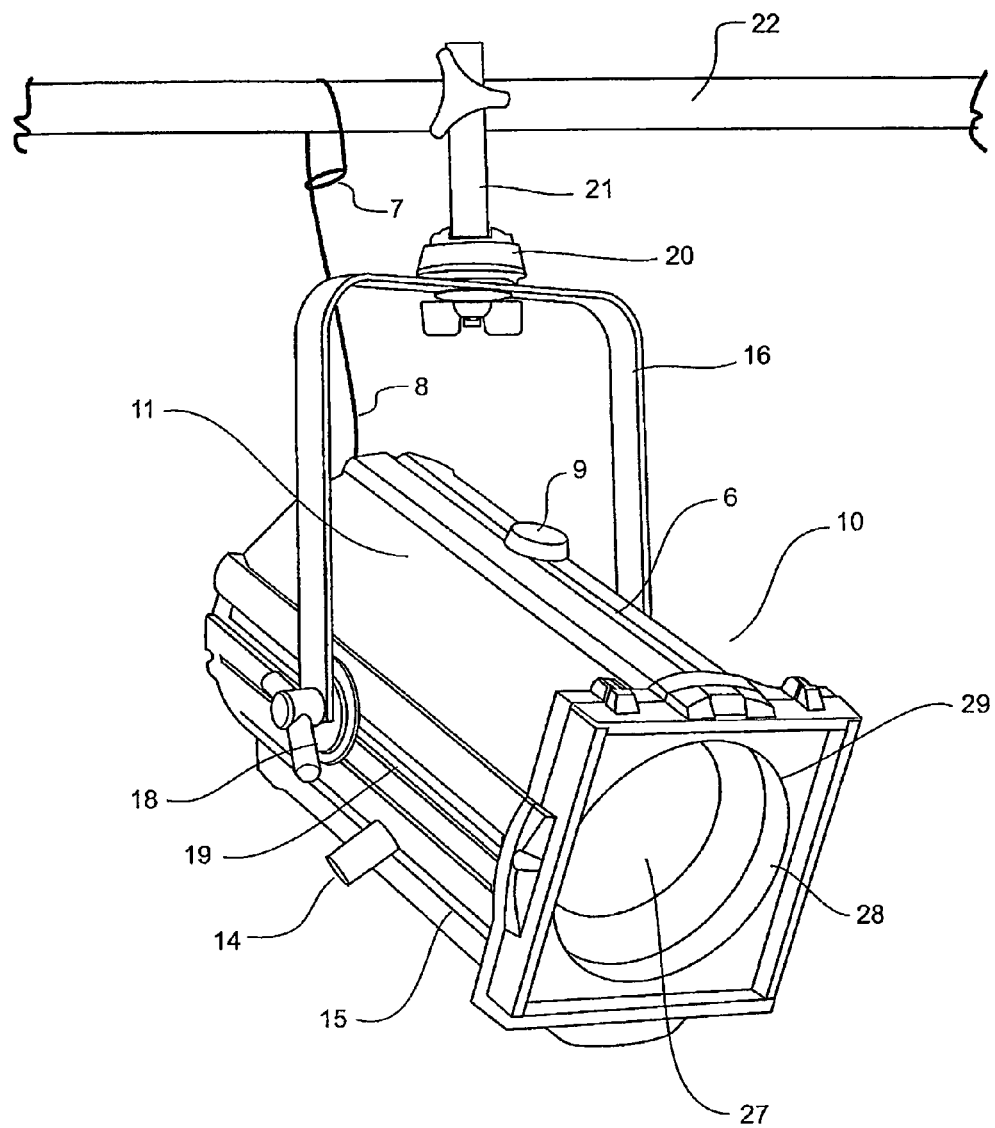
FIG. 1 shows a perspective view of a lighting unit attached to a lighting rig according to the preferred embodiment of the invention, the unit including pan, tilt and focus adjustment mechanisms.

FIG. 1 shows a preferred embodiment of a lighting unit 10 or lighting apparatus according to the invention. The lighting unit shown in FIG. 1 is a luminaire, however it will be appreciated that the invention could include, or be applied to, other types of lighting unit. The lighting unit 10 comprises a housing 11 formed from extruded material such as aluminium or any other suitable material. A light source 92 and reflector 93 is disposed in the housing on an adjustment assembly 94, 95 (shown in FIGS. 4f, 4g) that generates a light beam that shines through an aperture 28 at the front of the unit 10. The lighting unit includes a lens 27 and a colour frame holder 29 for holding a colour frame 70 with filter insert (not shown in FIG. 1). It will be appreciated that the lens and lighting arrangements inside the housing can be any known in the art.

A hand adjustable focus actuator 14 protrudes through a slot 15 formed in the extruded housing 11. The actuator 14 is connected to the sliding tray that supports the light source 92 inside housing 11. The actuator 14 and sliding tray form the focus adjustment mechanism. A first U-shaped support bracket 16 formed from any suitable material straddles the diameter of the housing 11 and is attached to opposite sides of the housing, on one side by a tilt adjustment mechanism 18 and by any other suitable means on the other side (not shown). The tilt adjustment mechanism 18 is slidably engaged in a channel 19 formed in the extruded housing 11. A pan adjustment mechanism 20 is coupled to the apex of the support bracket 16. Coupled to the pan adjustment mechanism 20 is a mounting bracket 21 for attaching the lighting unit 10 to a lighting rig 22 or other light support means. The mounting bracket or suspension hook clamp 21 can be any of a range of mounting brackets commonly used in the lighting industry. Alternatively, the lighting apparatus might be attached directly to a lighting rig via the pan adjustment mechanism.

A slideable actuator 9 is provided for retraction and release of a safety wire 8. The end of the safety wire 8 includes a carabiner 7 or other suitable coupling for attachment to the rig 22 as a safety precaution. The actuator 9 slides in a slot 6 in the housing 11, and is retained in place by a nut and bolt assembly (not shown) on the inside of the housing 11. By pushing the actuator 9 to the front of the housing, the safety wire 8 is retracted into the housing for storage. Release of the wire 8 is effected by pushing the actuator 9 towards the rear of the housing 11. The remaining features of the lighting unit are known to those skilled in the art and need not be described in detail.

The hand adjustable pan, tilt and focus mechanisms according to a preferred embodiment of the invention are described in further detail with reference to FIGS. 2 to 6c. FIGS. 2 and 4a to 4e show the detail of the hand adjustable focus actuator 14 according to the preferred embodiment of the invention. The focus actuator 14 can be gripped on a finger grip portions 23a and 23b to release the focus adjustment mechanism and allow the focus actuator to slide within the slot 15. Indicia 24 showing beam angles are printed or otherwise marked on the housing 11 adjacent to the slot 15. The beam angles indicate positions for placing the adjustment actuator 14 to obtain the required beam angle. By gripping the adjustment actuator finger grips 23a, 23b, the actuator 14 can be slid in the housing slot 15 and moved to the appropriate focus position in accordance with the markings 24 on the housing 11. By doing so, the slide tray within the housing 11 is adjusted to place the light source 92 at the required position to obtain the desired beam angle.

Figure 4A:
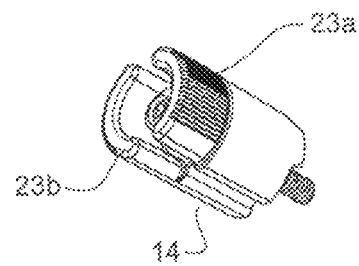
FIGS. 4a to 4e show various views of a preferred embodiment of the focus adjustment actuator.
Figure 4B:
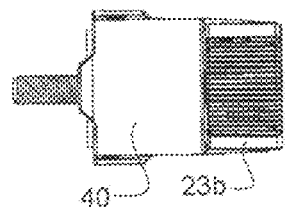
Figure 4C:
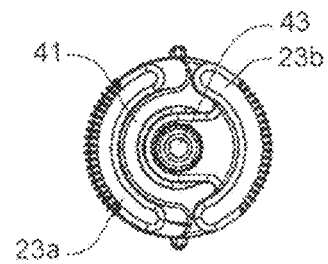
Figure 4D:
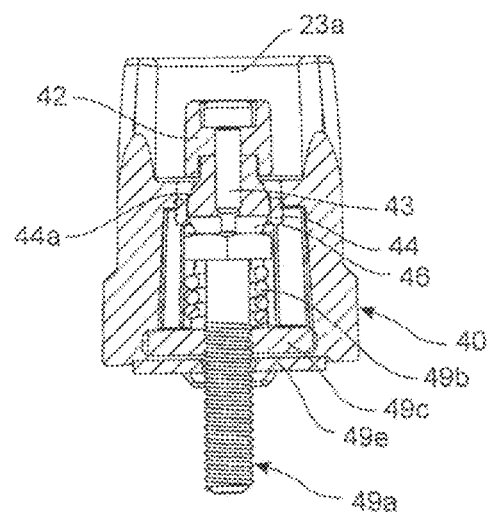
Figure 4E:
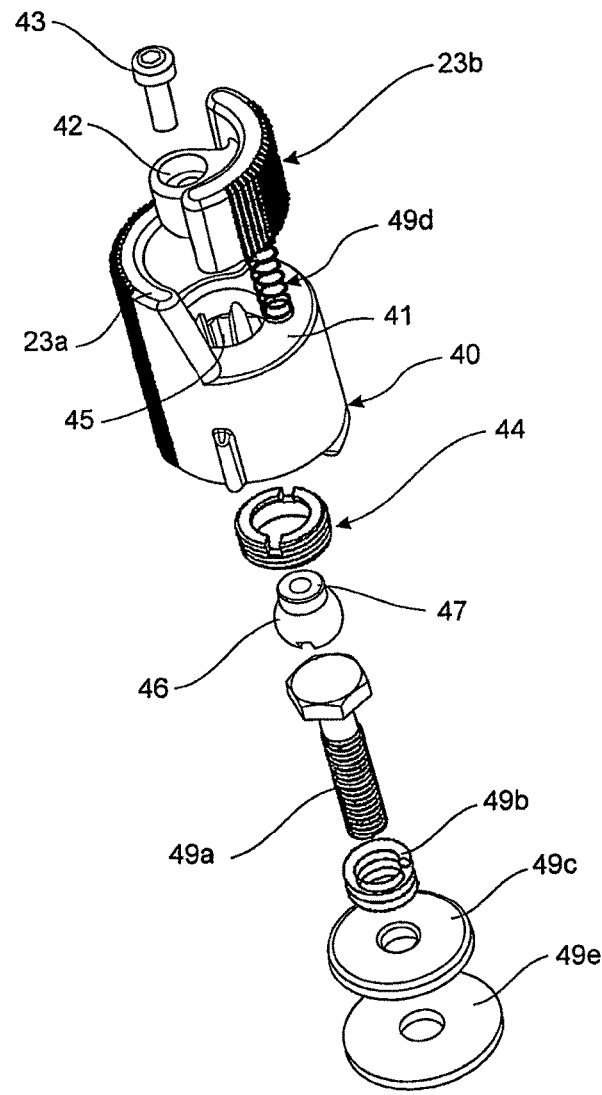

FIGS. 4a to 4e shows the various views indicating detail of the focus adjustment actuator 14. Referring to FIG. 4e the actuator 14 comprises a cylindrical outer housing 40, with a hexagonal inner bore and an annular top surface 41. An arcuate protrusion extending from one side of the top surface 41 forms one of the finger grips 23a. The finger grip 23a includes a profiled surface or similar to provide grip. The opposite finger grip 23b is formed from an arcuate member with a lug 42 protruding radially inwards from the inner surface of the grip 23b. The lug 42 includes a countersunk bore for a cap screw 43. The second finger grip 23b is fashioned for seating on the top surface 41 of the housing 40, such that the bore aligns with the opening 45 in the annular surface 41. The thumb grips 23a and 23b are made from a suitably flexible and resilient material such as high impact glass filled VO rated UV stabilized plastic to enable the second thumb grip 23b to deform radially inwards upon a radial pressure exerted by a finger or thumb.

As can be seen in FIGS. 4c and 4d, the interior of the cylindrical housing 40 includes a partially spherical bearing surface 44a formed on the underside of the threaded insert 44. The threaded insert 44 sits inside the body 40 around the annular opening 45. It engages with a annular collar 44b located inside the body 40. A partially spherical knuckle joint 46, preferably made from brass, is seated in the annular opening 45 through the threaded insert 44 such that the outer spherical surface 46 abuts against the bearing surface 44a of the threaded insert 44. A cylindrical engagement portion 47 extends from the top of the knuckle joint 46 and protrudes through the annular opening 45. The cap screw 43 is located in the bore of the lug 42 and protrudes into a blind bore in the knuckle protrusion 47 in order to retain the knuckle joint 46, housing 40 and second finger grip 23b in an axially aligned position. A bolt 49a having a hexagonal bolt head is received in the collar 44b in the cylindrical housing 40. The head of the bolt 49a abuts against a flattened base of the knuckle joint 46. A spring 49b fits axially over the bolt 49a within the collar 44b. It provides a bias force towards the opening 45 and bears against a first washer 49c that sits on a first boss around the internal perimeter of the body 40. An annular plate 49e is slid over the bolt 49a and rests on a second boss in the housing to cap the base of the housing 40. The bolt 49a protrudes through the plate 49e for engagement into a sliding plate 55 (seen in FIG. 2) that retains the adjustment actuator 14 in a sliding relationship in the slot 15. In the default position, the spring biases the head of the bolt 49a onto the base of the knuckle 46. This biasing force pulls the sliding plate 55 against the inner side of the housing adjacent to the slot 15 and retains the thumb adjustment actuator 14 and the associated focusing mechanism in a fixed position through a frictional force. A biasing spring 49b sits between the finger grip 23b and annular surface 41.

Figure 4F:
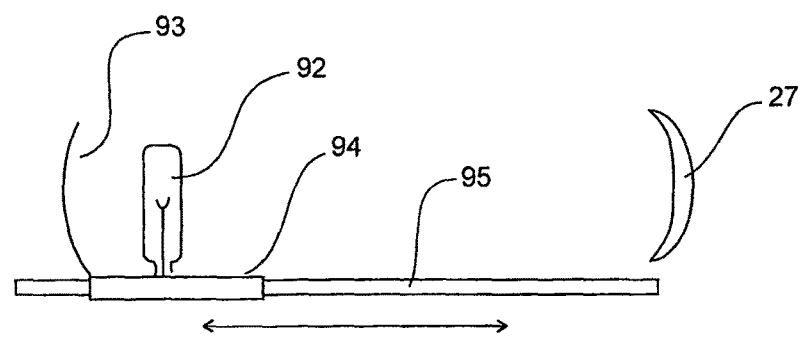
FIGS. 4f and 4g show a schematic view of a focus adjustment assembly.
Figure 4G:
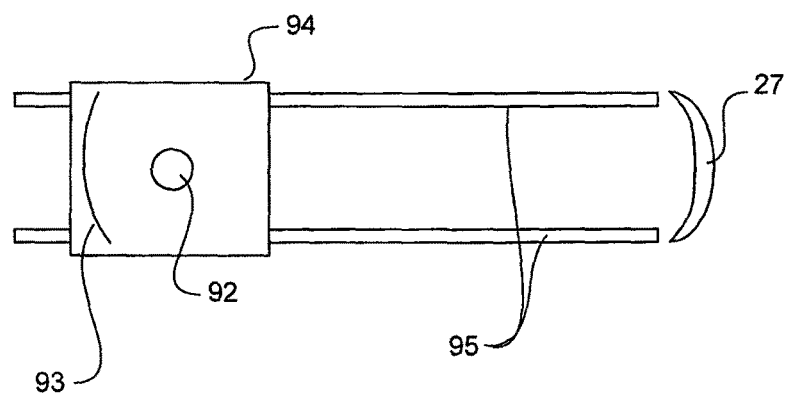
Figure 5A:
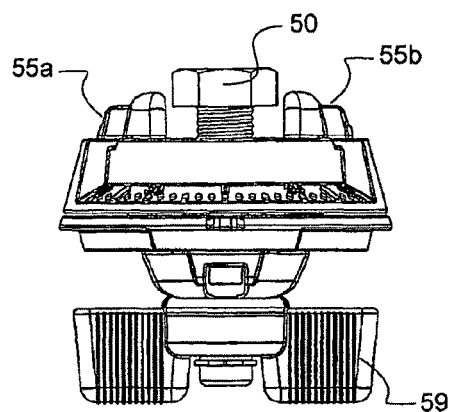
FIGS. 5a to 5e show various views of a preferred embodiment of the pan adjustment means.
Figure 5B:
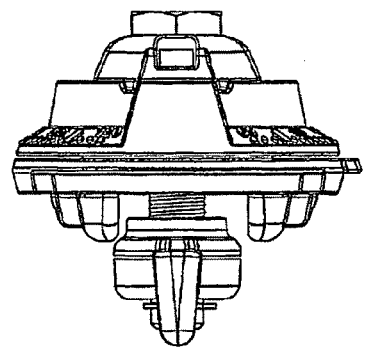
Figure 5C:
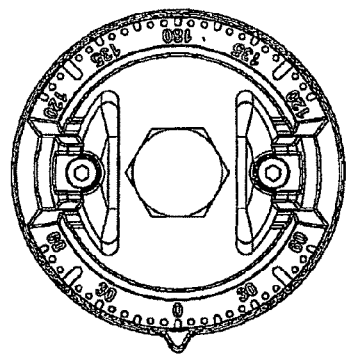
Figure 5D:
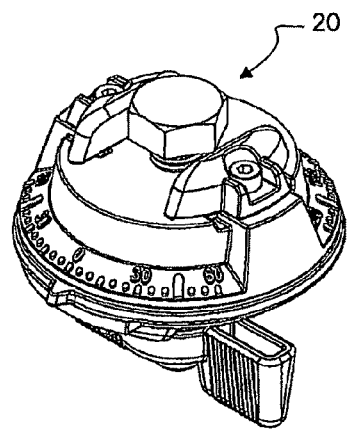
Figure 5E:
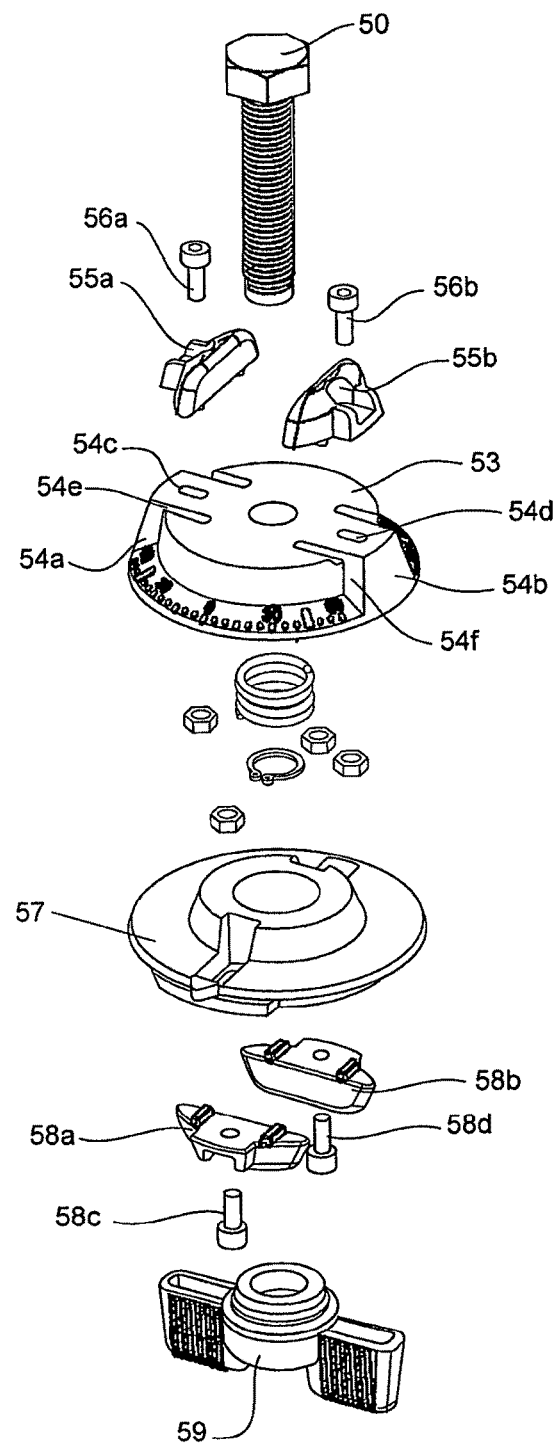

FIGS. 4f and 4g show in schematic form a possible form of the focus adjustment assembly that is controlled by the focus actuator 14. The assembly includes a focus tray 94 that is slideably coupled to a pair of rails 95 disposed in the lighting unit housing 11. A reflector 93 is disposed on the tray 94, along with a light source 92 placed in front of the reflector 93. They are arranged such that light from the source 92 is reflected towards the lens 27 that is fixed at the front end of the housing 11, in line with the aperture 28. The tray 94 is coupled to the focus actuator 14 such that the tray 94 can be slid along the rails 95, closer to and further from the lens 27 by moving the actuator 14. In doing so, the focus and beam angle of the beam output from the lighting unit 10 is adjusted. It will be appreciated that any suitable focus assembly known to those skilled in the art could be used.

By squeezing the thumb adjustments 23a and 23b radially inwards, a lateral force is transferred through the cap screw to the knuckle 46 causing the knuckle to rotate on the bearing service 44a. This tilts the knuckle 46, which in turn provides a downwards force on the head of the bolt 49a pushing the bolt 49a axially downwards against the force of the spring. This in turn releases the slide plate 55 from the back of the housing 11 adjacent to the slot 15 thus releasing the thumb adjustment actuator 14. This allows the thumb adjustment actuator 14 to be slid to the desired focusing position along the channel, which in turns slides the tray 94 in the housing 11 to adjust the beam angle as required.

FIGS. 3 and 5a to 5e show various views of the manual pan adjustment mechanism 20. The adjustment mechanism includes a bolt 50 that retains the entire assembly in axial alignment. An upper coupling plate 52 with a central hole is slid over the bolt. The upper coupling plate includes indicia indicating angular markings on the circumference and a frustoconical cone 53 protrudes from a central portion to provide an inner bearing surface (not shown). Protruding raidially outwards from the cone 53 are two diametrically opposed shelves 54a 54b, each one including an elongated hole 54c, 54d and two lateral slots 54e, 54f either side of the shelf 54a, 54b and extending part way into the cone 53.

Two retention clamps 55a 55b are provided, each having two spaced apart protrusions on their base that engage in respective slots 54e, 54f on the shelves 54a, 54b. Each retention clamp 55a, 55b also includes a flat clamping surface and a lug with a hole for receiving a respective cap screw 56a, 56b. The retention clamps 55a, 55b provide a coupling to couple the mechanism 20 to the mounting bracket 21. Each retention clamp is assembled such that the protrusions engage in that the slots 54e, 54f with the flat clamping surface directed radially inwards. The retention clamps 55a, 55b are slid laterally in the slot to provide a gap between them commensurate with the width of the mounting bracket 21 being used to attach the lighting unit 10 to the rig 22. Once in a suitable position, caps screws 56a, 56b are placed through their respective lug holes and nuts are screwed on from the underneath of the upper coupling plate 52 to screw the retention clamps in place and fix them in position. A bias spring is placed over the bolt 50 to sit underneath the upper coupling plate 52 and provide a biasing force upwards on the plate.

A lower coupling plate 57 is also provided. It includes a raised frustoconical cone 57 providing a bearing surface for frictional engagement with the inner bearing surface of the frustoconical cone 53 of the upper coupling 52. Lower retention clamps 58a, 58b and respective cap screws 58c, 58d similar to that for the upper coupling plate 52 are also provided for the lower half. The retention clamps 58a, 58b provide a coupling to couple the mechanism 20 to the support bracket 16. They are installed and adjusted in the same manner as the upper retention claims 55a, 55b so that the gap between the clamping surfaces of the retention clamps is commensurate with the width of the support bracket 16. A circlip is placed over the bolt and the lower coupling plate 57 assembly is fitted over the nut and rest against the underside of the upper coupling plate 52. The circlip prevents the wing bolt being inadvertently unscrewed.

A wing nut 59 is screwed onto the bolt 50 to hold the entire assembly in a clamped fashion. A hole in the end portion of the mounting bracket 21 is aligned with the bolt 50 prior to assembly and the retention clamps 55a and 55b adjusted as required to securely fasten the mounting bracket 21 to the pan adjustment mechanism 20. Similarly, a hole in the apex of the support bracket 16 is threaded over the bolt prior to attachment of the wing nut 59. The lower retention clamps 58a, 58b underneath are adjusted as required and the wing nut 59 tightened to securely fasten the support bracket 16 to the underside of the pan adjustment mechanism.

The wing nut 59 retains the upper and lower coupling plates 52, 57 in a clamped relationship such that the opposing friction bearing surfaces of the respective cones 53, 57 prevent rotation of the upper plate 52 relative to the lower plate 57. This prevents angular movement of the lighting unit 10 with respect to the rig 22. To adjust the pan angle of the lighting unit 10, the wing nut 59 is released as required such that the biasing force of the spring pushes the upper and lower plates 52, 57 apart to release the friction between the bearing surfaces 53, 57. This enables the upper plate 52 to be rotated relative to the lower plate 57 thus enabling the pan angle to be adjusted as required using the angular indications or indicia. Preferably, some residual cone contact remains ensuring that the mechanism is not freely moveable, but requires some operator pressure to allow adjustment. Only a small hand/arc movement is required to release and lock the mechanism. The small amount of residual friction left when released is by cone connection and the bias force of the spring. Once the correct angle (as determined from the indicia) has been achieved through relative rotation of the coupling plates, they can be locked together.

Figure 6C:
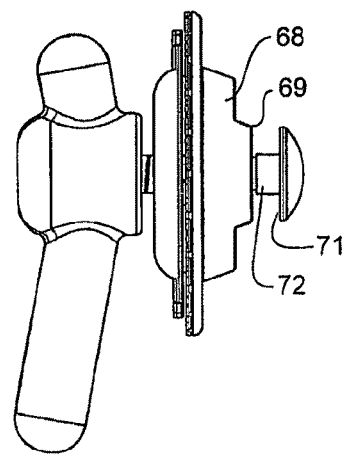
Figure 6C:
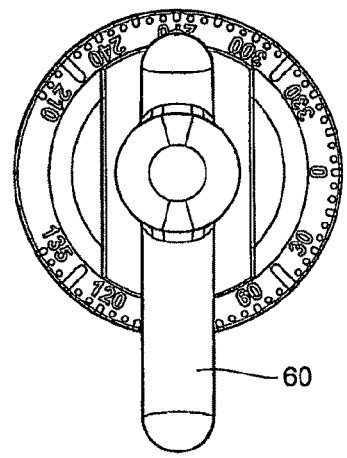
Figure 6C:
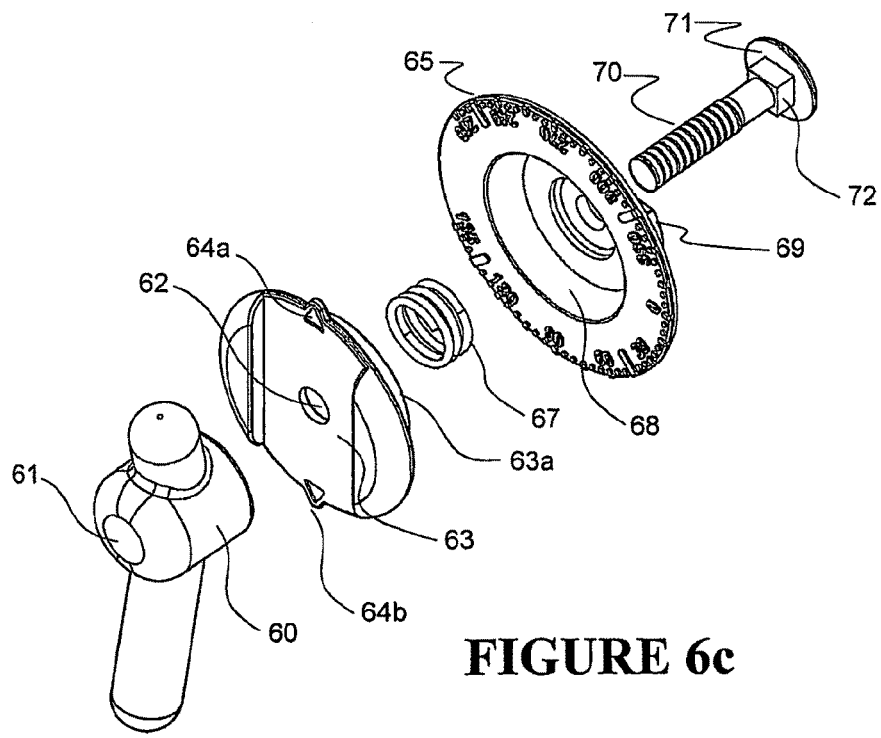

A detailed description of a preferred tilt adjustment mechanism of the invention will described with reference to FIGS. 2 and 6a to 6c. The tilt adjustment mechanism 18 allows the angle between the support bracket 16 and the longitudinal axis of the lighting unit 10 to be adjusted as required. Referring to FIGS. 6a to 6c, the tilt adjustment actuator 18 includes an adjustment handle 60. The handle includes a threaded bore 61 which aligns with a bore 62 on a first coupling plate 63. The first coupling plate 63 includes a recess across the diameter for receiving an end of the support bracket 16. On the other face, a frustoconical cone 63a extends to provide a bearing surface 63a. A hole (not shown) in the support bracket 16 aligns with holes 61, 62 of the tilt adjustment mechanism 18. The first coupling plate 63 also includes one or more indicators 64a, 64b for indicating the angular setting of the tilt mechanism 18. A second coupling plate 65 with indicia showing angular markings on the perimeter 66 is profiled to engage with the frustoconical cone 63a protruding from the rear face of the first coupling plate 63. A spring 67 is disposed between the first coupling plate 63 and the second coupling plate 65 and is aligned axially with holes 61, 62 to bias the coupling plates 63 and 65 away from each other.

Figure 2:
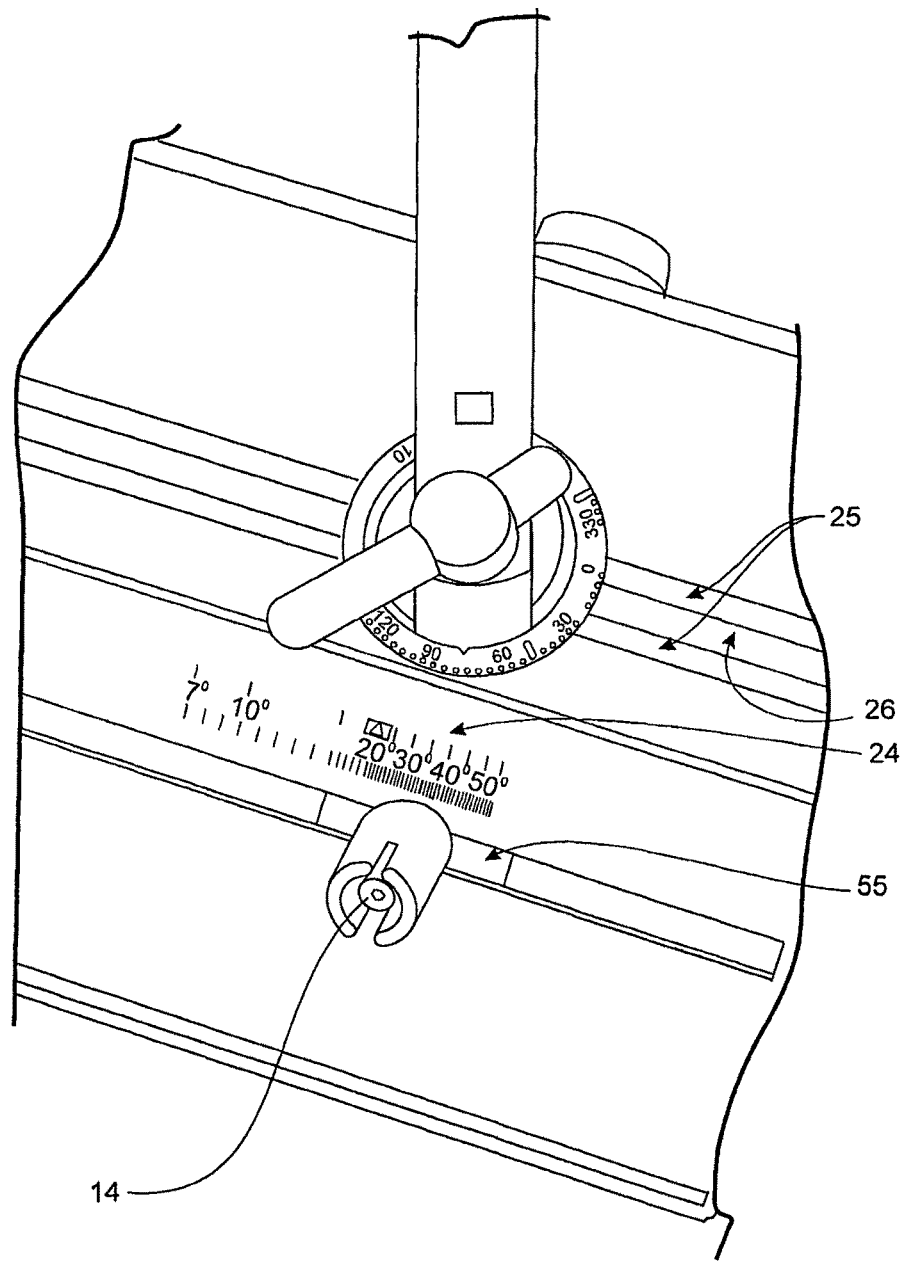
FIG. 2 shows the tilt and focus adjustment means in more detail.
Figure 3:
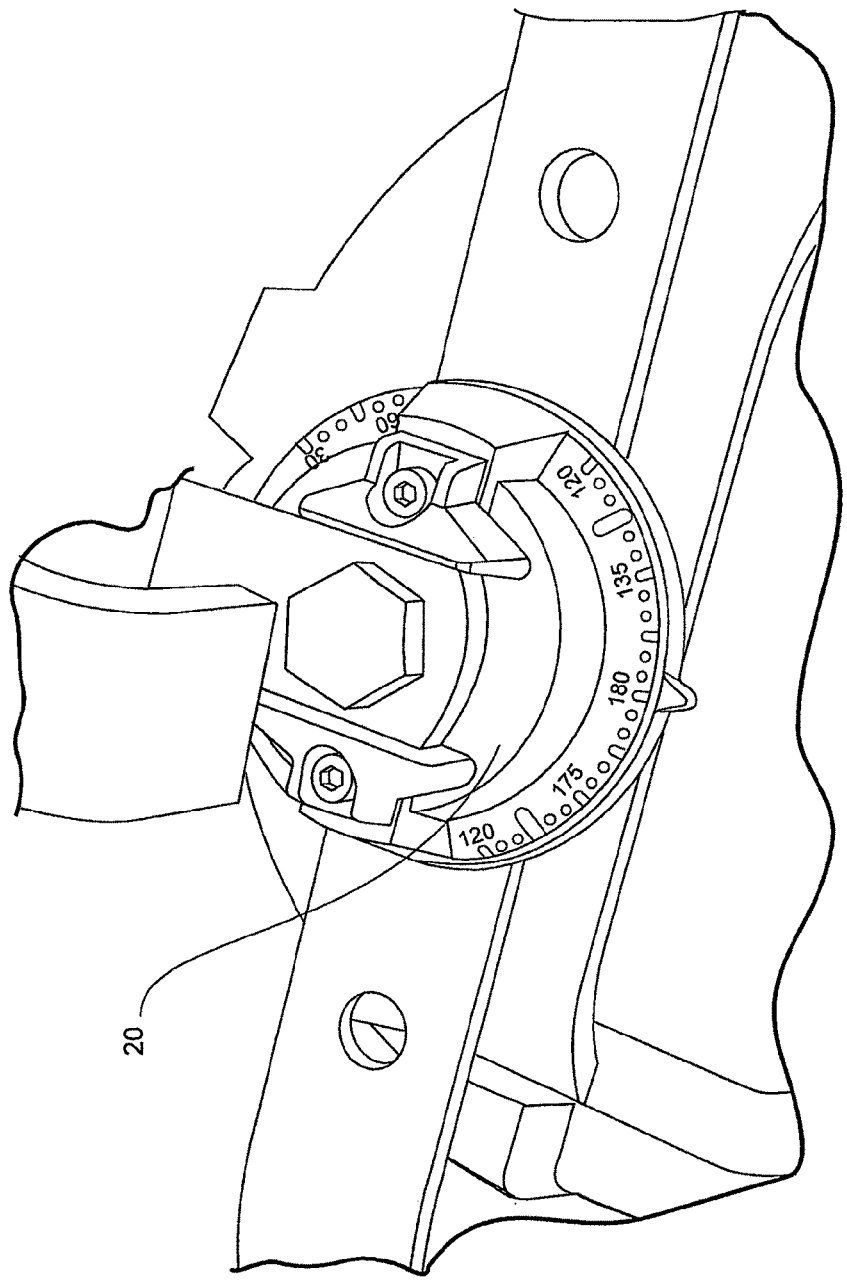
FIG. 3 shows the pan adjustment means in more detail.

As seen in FIG. 6a, the rear surface of the second coupling plate 65 is profiled to include two bearing surfaces 68 and 69, the first 68 engaging with the frustoconical cone 63a from the first coupling plate 63. The tilt mechanism 18 is engaged in the tilt housing channel 19 such that the bearing surface 68 abuts and bears against a first profiled shelf 25 of the tilt housing channel 19 (as shown in FIG. 2). The second bearing surface 69 is formed as a raised profile across the diameter of the first bearing surface 68 and is dimensioned to be received within the opening 26 of the tilt housing channel 19. The components of the tilt mechanism 18 are retained in axial alignment by way of a threaded bolt 70. The adjustment handle 60 can be screwed onto the threaded bolt 70 to retain all the components in an axially aligned clamped arrangement. The head of the bolt is profiled with a flat bearing surface 71 and a square cross-sectioned engagement block 72. The bolt 70 is arranged in the tilt housing channel 19 such that bearing surface 71 is seated behind profiled shelf 25 in the channel 19. The engagement block 72 is dimensioned to slidably engage in the slot 26 of the tilt housing channel 19.

The tilt mechanism 18 is assembled by first inserting the bolt 70 in the tilt housing channel 19 such that it protrudes from the channel and the remaining components are placed over the bolt and the handle 60 screwed onto the bolt. When the handle is fully screwed onto the bolt it clamps the components into position and holds them at a fixed angle with respect to the channel 19. This occurs by way of spring 67, which provides a bias force onto the inside of the second coupling plate 65 to push the bearing surface 68 of the plate onto the profiled channel shelf 25. The spring also biases in the opposite direction to push the first coupling plate 63 and the handle 60 away from the channel thereby pulling the bolt and bolt head such that the bearing surface 71 is pulled onto the back side of the profiled channel shelf 25. This effects a resistance fit which holds the angle between the channel 19 and the support bracket 16 in a fixed position while the handle 60 is kept fully screwed and also fixes the lateral position of the mechanism 18 in the channel 19. To adjust the tilt angle, the handle 60 is unscrewed slightly to partially release the tension in the spring and release the cone bearing surface 63a on the first coupling plate 63 from the inner bearing surface of the profiled shelf 68 on the second coupling plate 65. This allows the entire assembly to be rotated as required to provide the desired tilt angle using the printed indicia. Preferably, some residual cone contact remains ensuring that the mechanism is not freely moveable, but requires some operator pressure to allow adjustment. Only a small hand/arc movement is required to release and lock the mechanism. The small amount of residual friction left when released is by cone connection and the bias force of the spring. Further, the bolt 70 can be released from the back of the profiled shelf in the channel 25 to enable the mechanism 18 to be slid in the tilt channel 19 to adjust the pivot position of the mechanism 18 Once the correct angle (as determined from the indicia) has been achieved through relative rotation, they can be locked together.

Figure 7A:
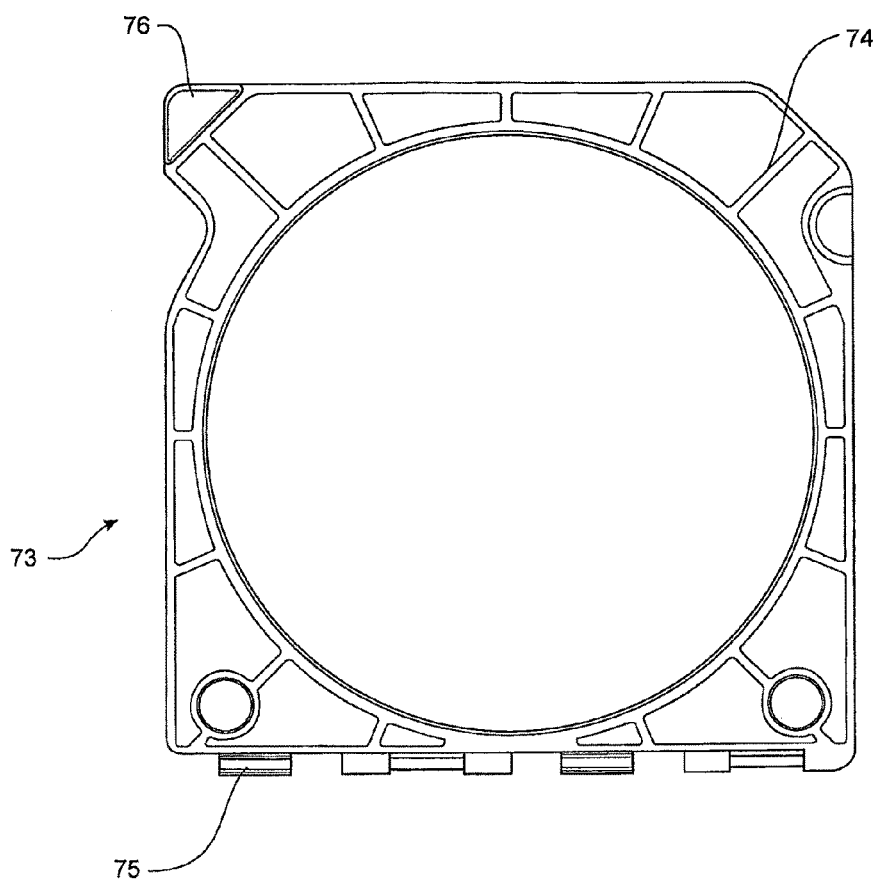
FIGS. 7a to 7c show various views of a preferred embodiment of a colour frame.
Figure 7B:
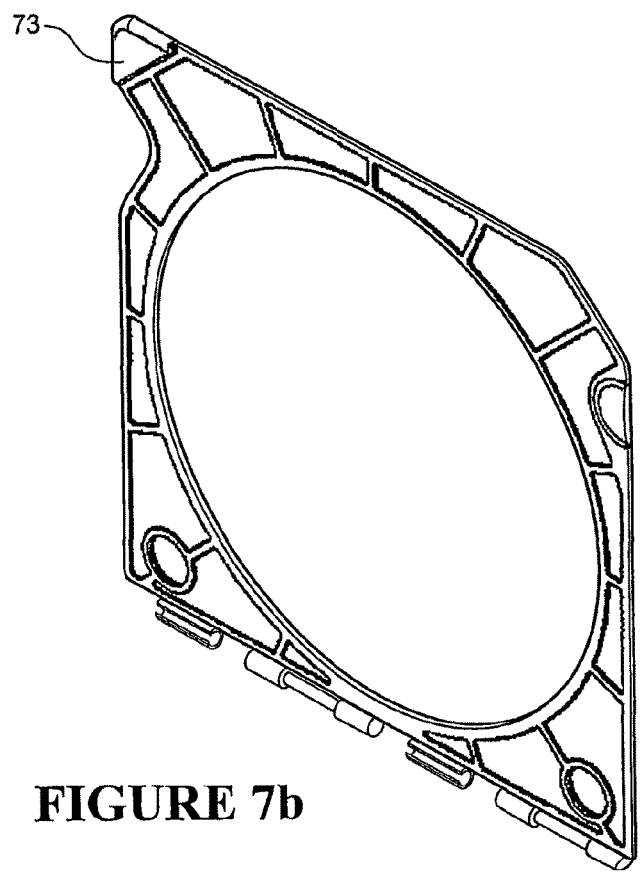
Figure 7C:
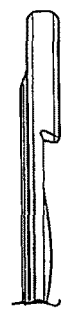

FIG. 7 shows a colour frame which optionally can be inserted in the front of the lighting unit 10. The colour frame holds a plastic light filter in place. The colour frame comprises a substantially square frame 73 with an interior opening and rounded or bevelled edges. The frame 73 is produced from a plastic moulding and includes moulded radial webs e.g. 74 that provide rigidity. Two frames 73 that are mirror images of each other are produced and then hinged together by the hinge engagement means 75 along the bottom edge. A plastic lighting filter (not shown) can be placed in the frame and then the two halves 73 of the colour frame are closed shut and locked into position by a click latch 76. The webbings 74 then clamp onto the plastic light filter at the edges and retain it in place. This mechanism provides a convenient means by which to insert and remove colour filter plastic, and also retains it in a manner such that folding and softening is minimised, which reduces their efficacy. The plastic construction reduces weight and therefore minimises the danger if it is dropped from a height. The dimensions shown in FIG. 7 are indicative only, and it will be appreciated that the colour frame could be manufactured to any required size.

Figure 8:
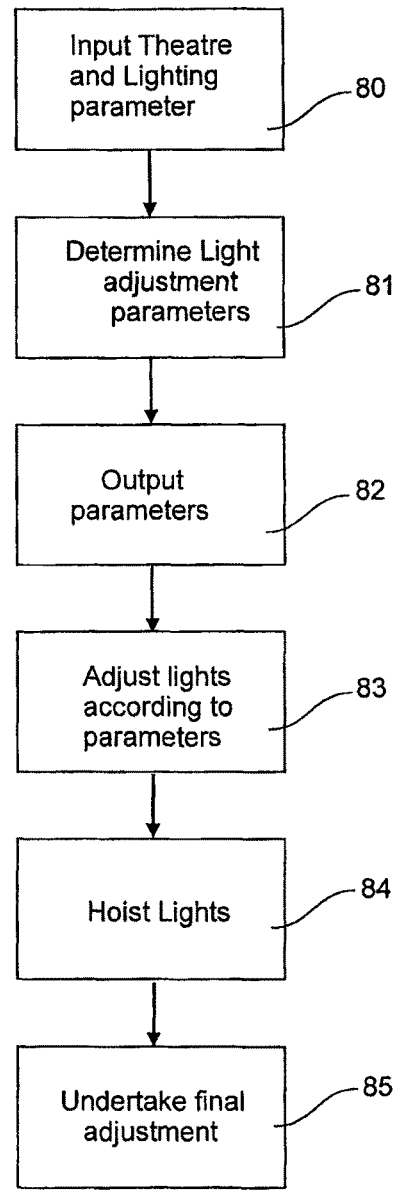
FIG. 8 shows a method of adjusting lighting units according to a preferred embodiment of the invention.

A preferred system and method for adjusting lighting units in a theatres, auditoriums, halls and the like will be described with reference to FIGS. 8 to 12. FIG. 8 shows a preferred method for pre-adjusting lights prior to them being hoisted and suspended from the ceiling of a theatre or the like. Preferably the method used is a lighting unit that has pan, tilt and/or focus adjustment mechanism according to the invention and as described with reference to FIGS. 1 to 7. However, it will be appreciated that such a system and method might be implemented with other types of adjustment mechanisms. As shown in step 80, light modelling software known to those skilled in the art is used to determine the lighting plan, including the required the number and placement of lighting units on a rig or ceiling to appropriately light the desired space. Further, the modelling software is used to determine the pan, tilt and focus settings for each of those light units. The modelling can be done using any lighting modelling software known to those skilled in the art, such as the WYSIWYG™ software.

Figure 9:
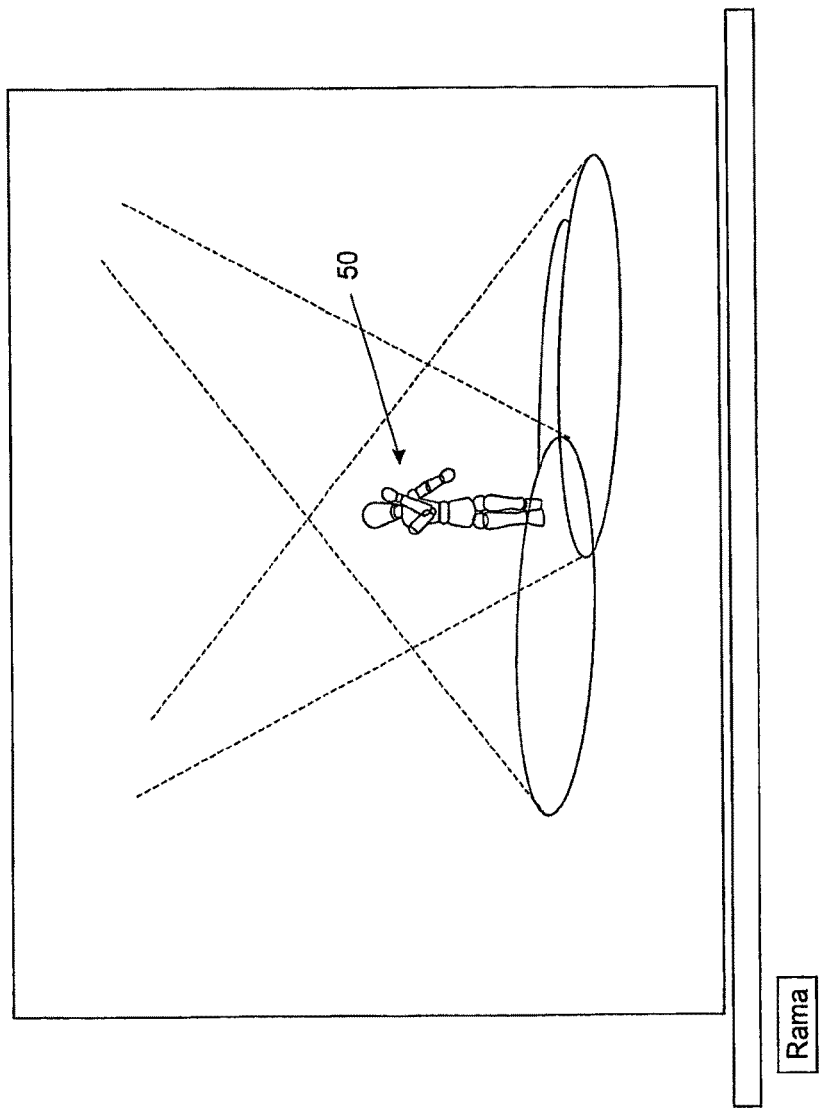
FIG. 9 shows software modelling the lighting requirements for a performer on stage.

As shown in step 80, first the required theatre and lighting parameters are entered into the modelling software. These parameters include, although are not limited to, theatre size, lighting requirements, and other parameters that will be known to those skilled in the art. Referring to FIG. 9, an example is shown where a single performer 90 on a stage requires lighting from three spot lights. The software is used to model the performer 90 on the stage and also model the lighting to determine what type of lighting is required and how the lighting is to be achieved.

Figure 10:
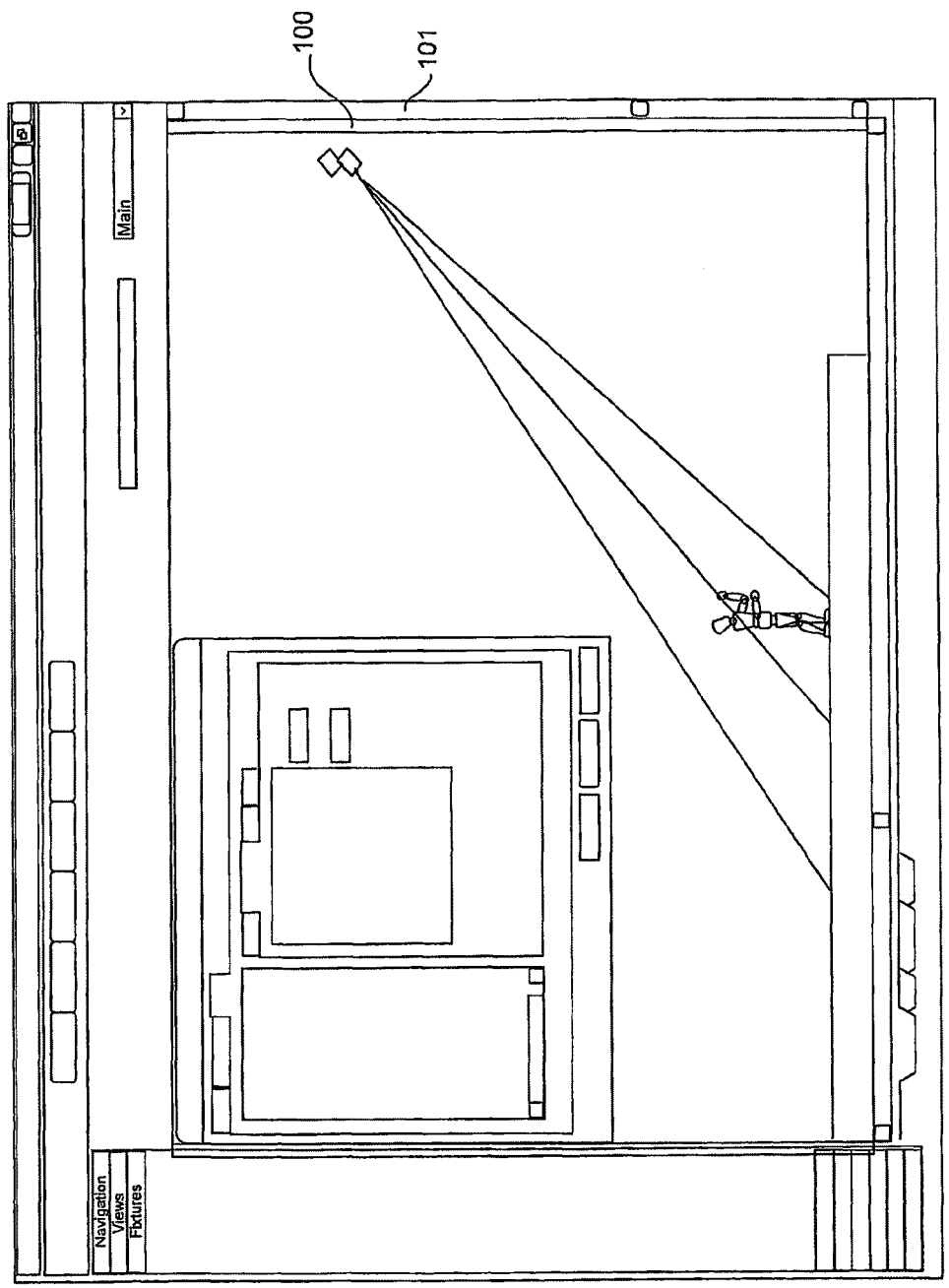
FIG. 10 shows a ray diagram indicating the illumination area of a modelled lighting unit.
Figure 11:
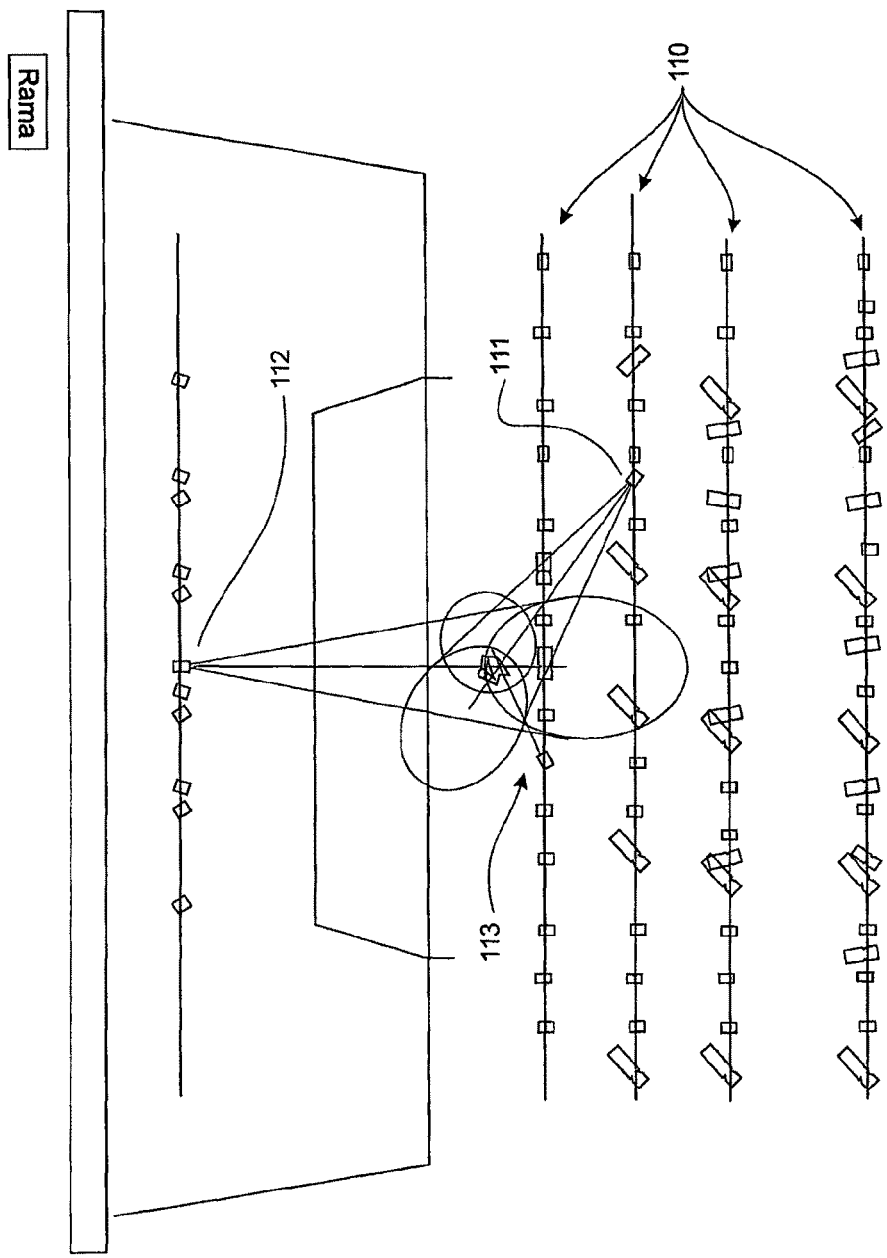
FIG. 11 shows an exemplary lighting plan determined by the modelling software.
Figure 12:
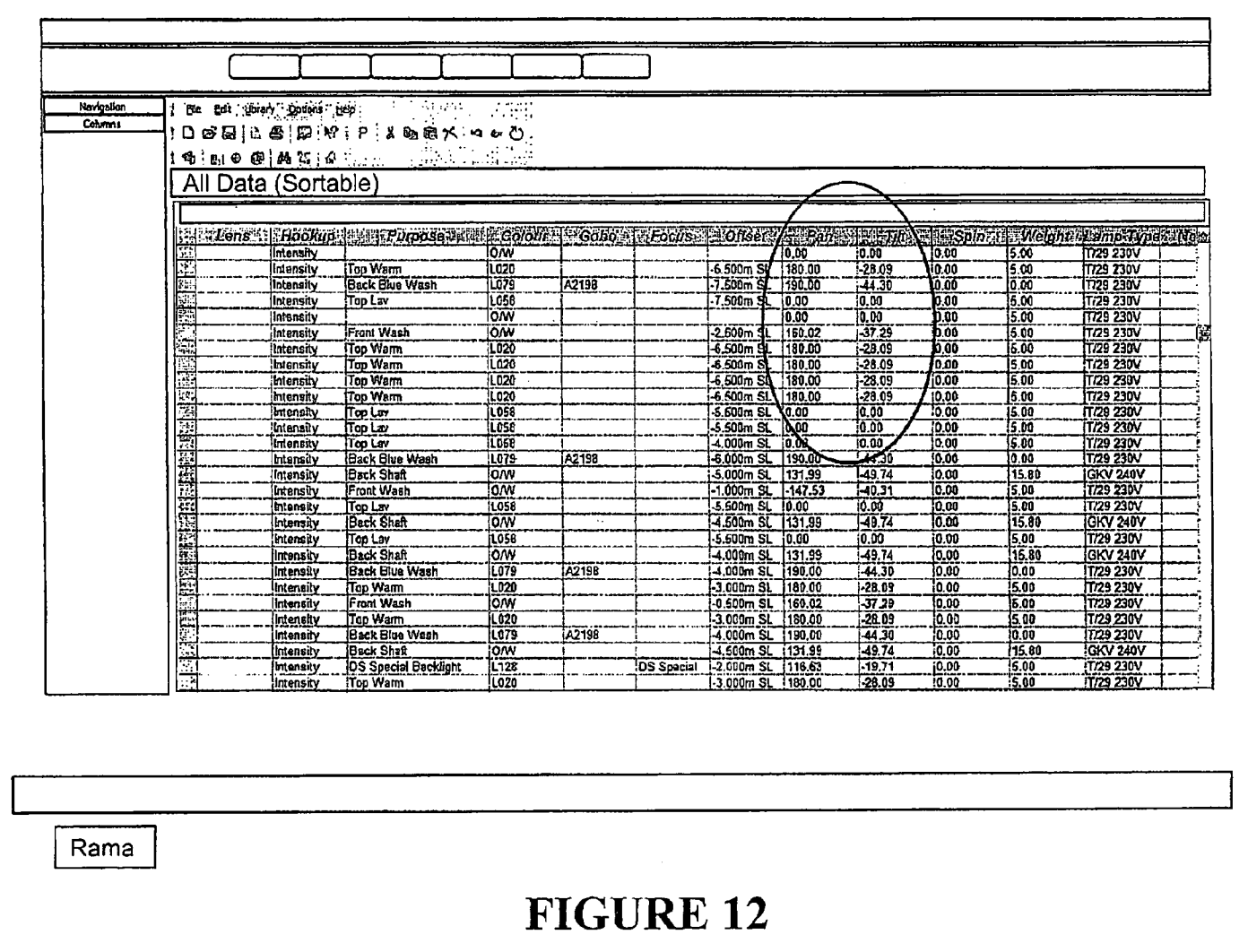

In step 81, the software then determines the lighting plan parameters required to achieve the desired lighting. Referring to FIG. 10, individual lights 100 and their light beams 101 are displayed by the software showing their position, the shadows that they will cast, and the lighting area they will illuminate in line form. This process can be carried out for each lighting unit, and then an entire lighting rig 110 is determined to provide the required lighting as shown in FIG. 11. Several lighting rigs are shown with numerous lighting units on each rig. Each lighting unit is shown in the orientation required to produce the desired lighting by the software. The lights 111-113 producing the three spot lights in FIG. 9 are indicated in FIG. 11 along with the lines showing their illumination area. It will be appreciated that the other lights are required for producing lighting requirements for other parts of the performance. The software determines the lighting rig parameters, including the pan, tilt and focus adjustments for each light and then these can be output, step 82, in a desirable form, such as an electronic file or printout as shown in FIG. 12. Using these output parameters determined from the modelling software, a lighting technician can prepare a lighting rig prior to hoisting the lighting rig in the theatre.

It will be appreciated that alternatively a designer could calculate the parameters themselves, using lighting plan oblique sections.

First, the lighting technician clamps all the required lighting units onto the light support (such as a lighting rig) in the positions required using appropriate mounting brackets, such as mounting bracket 21 shown in FIG. 1. Then for each lighting unit the pan, tilt and focus are adjusted according to the output parameters, step 83. For example, firstly the focus can be adjusted by gripping the focus adjustment actuator 14 and adjusting the beam angle as indicated on the markings. Then the tilt angle of the lighting unit can be adjusted using tilt adjustment mechanism 18. Firstly the handle 60 is loosened, and then the lighting unit 10 is swivelled on the support bracket 16 until the required angle between the lighting unit 10 and bracket 16 is achieved according to the angular indications on the tilt adjustment mechanism 18. Then the handle 60 is hand tightened to fix the tilt angle and hold it in position. Finally the pan angle is adjusted by loosening the wing nut 59 of the pan adjustment mechanism 20 and then rotating the support bracket 16 in relation to the mounting bracket 21 to the desired angle as indicated on the indicia of the upper plate 52. A similar process can then be carried out for all the remaining lighting units on the rig. Once all the initial settings have been made according to the parameters determined by the modelling software, the lights can be hoisted to the ceiling and suspended from the space to be lighted, step 84. Finally, a technician can be hoisted up to the lights, and minor readjustments to the lights made using the pan, tilt and focus mechanism as required, step 85.

In an alternative embodiment, the lighting units may be attached to a lighting rig permanently fixed to the ceiling. Alternatively, the lighting units might be attached individually to the ceiling. In these cases, adjustments to pan, tilt and focus are made at the ceiling level. Alternatively, light units might be individually hoistable, in which case adjustments can be made at the floor and ceiling level, as required.

As can be seen, the system facilitates a more efficient method for setting the adjustments of lights. First the modelling enables the settings for the lights to be pre-adjusted prior to hoisting. Further, the indications on the adjustment mechanisms enable the settings to be correlated with the output parameters determined by the modelling software. Further, the design of the mechanisms is such that the settings can be made by hand without the need for tools. This is particularly useful when the final adjustment takes place after the lights have been hoisted. This is a particularly dangerous task and requiring tools to make adjustments is both difficult and also provides the danger of the tools being dropped and hitting bystanders.

It will be appreciated that a person skilled in the art could apply the invention to other types of lighting. It would also be appreciated that many variations will be apparent to those skilled in the art and only part of the overall system method and apparatus could be implemented.

The invention claimed is:

1. A lighting apparatus comprising:
a housing with an aperture,
a light source disposed in the housing that is configured to produce a light beam that passes through the aperture;
a lens;
a focus adjustment mechanism configured to adjust a focus of the light beam, the focus adjustment mechanism comprising first adjustment indicia;
a tilt adjustment mechanism for attachment to the housing that permits adjustment of a direction of the light beam, the tilt adjustment mechanism comprising second adjustment indicia,
wherein the housing has a slot through which an actuator of the focus adjustment mechanism protrudes, and
wherein the housing has a channel, the tilt adjustment mechanism being slidably moveable in the channel for adjusting a pivot point of the tilt adjustment mechanism.

2. The lighting apparatus according to claim 1, wherein the actuator in configured to allow manual manipulation of the light source to adjust the focus of the light beam.

3. The lighting apparatus according to claim 2, wherein the actuator is connected to a sliding tray in the housing that holds the light source, and wherein the actuator allows movement of a relative position between the lens and the light source by manipulation of the sliding tray.

4. The lighting apparatus according to claim 3, wherein the actuator further comprises a spring loaded toggle brakes and manual release of the toggle brake to allow and prevent movement of the sliding tray.

5. The lighting apparatus according to claim 4, wherein the first adjustment indicia are displayed on the housing proximate to the slot to indicate beam angles produced corresponding to respective positions of the actuator in the slot.

6. The lighting apparatus according to claim 1, wherein the second adjustment indicia indicate tilt angles of the lighting apparatus.

7. The lighting apparatus to claim 1, wherein the tilt adjustment mechanism comprises:
- a first coupling adapted to couple the adjustment mechanism to the housing,
- a second coupling adapted to couple the adjustment mechanism to a first support, wherein the first and second coupling are moveable relative to each other, and
- a releasable locking mechanism that when locked restricts relative movement between the first and second couplings, wherein the second adjustment indicia are adapted to indicate the extent of tilt.

8. The lighting apparatus according to claim 1, further comprising a pan adjustment mechanism for attachment to the housing or a first support coupled to the housing, which permits adjustment of the direction of the beam, the pan adjustment mechanism comprising third adjustment indicia, wherein the third adjustment indicia indicate pan angles of the lighting apparatus.

9. The lighting apparatus according to claim 1, further comprising a pan adjustment mechanism for attachment to the housing or a first support coupled to the housing, which permits adjustment of the direction of the beam, the pan adjustment mechanism comprising third adjustment indicia, wherein the pan adjustment mechanism comprises:
- a first coupling adapted to couple the adjustment mechanism to the housing or a first support connected to the housing,
- a second coupling adapted to couple the adjustment mechanism to a light support, wherein the first and second coupling are moveable relative to each other,
- a releasable locking mechanism that when locked restricts relative movement between the first and second couplings, wherein the third adjustment indicia are adapted to indicate the extent of pan.

10. The lighting apparatus according to claim 9, wherein the first support is a bracket coupled to the housing for supporting the housing from a lighting rig.

11. The lighting apparatus according to claim 9, wherein the light support is a lighting rig.

12. The lighting apparatus according to claim 1, further comprising a slidable actuator for retraction and extension of a safety wire.

13. A lighting apparatus comprising:
- a housing with an aperture,
- a light source disposed in the housing that is configured to produce a light beam that passes through the aperture;
- a lens and a focus adjustment mechanism to adjust the focus of the light beam, the focus adjustment mechanism comprising first adjustment indicia;
- a tilt adjustment mechanism attached to the housing that permits adjustment of the direction of the light beam, the tilt adjustment mechanism comprising second adjustment indicia; and
- a pan adjustment mechanism attached to the housing or a first support coupled to the housing, which permits adjustment of the direction of the light beam, the pan adjustment mechanism comprising third adjustment indicia,
- wherein the housing has a slot through which an actuator of the focus adjustment mechanism protrudes, and
- wherein the housing has a channel, the tilt adjustment mechanism being slidably moveable in the channel for adjusting a pivot point of the tilt adjustment mechanism.

* * * * *